US010077636B2

(12) United States Patent
Marr et al.

(10) Patent No.: US 10,077,636 B2
(45) Date of Patent: Sep. 18, 2018

(54) USE OF NANOPARTICLES IN CLEANING WELL BORES

(71) Applicant: Halliburton Energy Services, Inc., Houston, TX (US)

(72) Inventors: Alan William Marr, Arbroath (GB); Lee Jeremy Hall, The Woodlands, TX (US); Philip Wayne Livanec, Deer Park, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1031 days.

(21) Appl. No.: 14/068,901

(22) Filed: Oct. 31, 2013

(65) Prior Publication Data

US 2014/0290958 A1 Oct. 2, 2014

Related U.S. Application Data

(63) Continuation-in-part of application No. 13/851,374, filed on Mar. 27, 2013.

(51) Int. Cl.
*B08B 7/00* (2006.01)
*E21B 37/06* (2006.01)
*C09K 8/524* (2006.01)

(52) U.S. Cl.
CPC .............. *E21B 37/06* (2013.01); *C09K 8/524* (2013.01); *C09K 2208/10* (2013.01)

(58) Field of Classification Search
None
See application file for complete search history.

(56) References Cited

U.S. PATENT DOCUMENTS 2,943,679 A * 7/1960 Scott, Jr. .................. C09K 8/03
166/285
4,431,550 A * 2/1984 Block ...................... C01F 7/02
507/124

(Continued)

FOREIGN PATENT DOCUMENTS

WO 2010148204 12/2010

OTHER PUBLICATIONS

Sridhara et al, (al2o3-Based Nanofluids: A Review, Jul. 16, 2011, nonoscale res. lett., 2011: 6(1): 456, Paragraph From Introduction and Paragraph From Applications of Alumina-Based Nanofluids.*

(Continued)

*Primary Examiner* — Binh X Tran
*Assistant Examiner* — David Cathey, Jr.
(74) *Attorney, Agent, or Firm* — Tenley Krueger Tumey L.L.P.

(57) ABSTRACT

Embodiments relate to removing residue from a well bore and well bore equipment with a treatment fluid composition, and in some embodiments, to treatment fluid compositions that comprise nanoparticles. An embodiment provides a method of removing drilling fluid residue from the surfaces of well equipment. The method comprising: applying a solid nanoparticle film to at least a portion of the surfaces of the well equipment with a treatment fluid comprising solid nanoparticles; and allowing the solid nanoparticles to interact with the surfaces of the well equipment and the drilling fluid residue adhered to the surfaces of the well equipment to remove at least a portion of the drilling fluid residue from the surfaces of the well equipment.

14 Claims, 3 Drawing Sheets

(56) References Cited

U.S. PATENT DOCUMENTS

| | | | |
|---|---|---|---|
| 4,444,699 A * | 4/1984 | Hayford | B01J 13/18 264/4.7 |
| 7,033,975 B2 | 4/2006 | Baran, Jr. | |
| 7,072,143 B2 * | 7/2006 | Kunikata | G11B 5/70 360/132 |
| 7,264,850 B1 * | 9/2007 | Itoh | C23C 16/26 216/71 |
| 7,559,369 B2 | 7/2009 | Roddy et al. | |
| 7,665,523 B2 | 2/2010 | Perez | |
| 7,784,542 B2 | 8/2010 | Roddy et al. | |
| 7,786,049 B2 | 8/2010 | Temple | |
| 7,806,183 B2 | 10/2010 | Roddy et al. | |
| 7,892,352 B2 | 2/2011 | Roddy et al. | |
| 2003/0024703 A1 | 2/2003 | Mckenzie et al. | |
| 2003/0220204 A1 * | 11/2003 | Baran, Jr. | B82Y 30/00 507/200 |
| 2005/0272611 A1 | 12/2005 | Lord et al. | |
| 2008/0217008 A1 | 9/2008 | Langdon et al. | |
| 2010/0016183 A1 | 1/2010 | Roddy et al. | |
| 2010/0025039 A1 | 2/2010 | Roddy et al. | |
| 2010/0096136 A1 | 4/2010 | Bourne | |
| 2010/0096139 A1 | 4/2010 | Holcomb et al. | |
| 2010/0273912 A1 | 10/2010 | Roddy et al. | |
| 2011/0272325 A1 | 11/2011 | Soane et al. | |
| 2012/0015852 A1 | 1/2012 | Quintero | |
| 2012/0132423 A1 | 5/2012 | Livanec | |
| 2012/0168165 A1 | 7/2012 | Holcomb et al. | |
| 2012/0175120 A1 | 7/2012 | Holcomb et al. | |
| 2012/0186494 A1 | 7/2012 | Roddy et al. | |
| 2012/0211227 A1 | 8/2012 | Thaemlitz | |
| 2012/0245059 A1 * | 9/2012 | McDonald | C09K 8/05 507/140 |
| 2012/0255887 A1 | 10/2012 | Holms et al. | |
| 2012/0283149 A1 | 11/2012 | Livanec | |
| 2012/0285690 A1 * | 11/2012 | Weaver | C09K 8/57 166/305.1 |
| 2013/0032409 A1 | 2/2013 | Livanec | |
| 2013/0045897 A1 | 2/2013 | Chakraborty et al. | |

OTHER PUBLICATIONS

Lifewater.ca, Mixing and Using Drill Mud, Feb. 1, 2001, Lifewater. ca, date stamp, paragraph about during the drilling process.*

Rohm and Haas, Acumer 1510 Polyacrylic Acid Homopolymer, 2008, Rohm and Haas, tittle, 1 paragraph of Performance advantages, Dilutability with water, 1 paragraph Compatibility with Organic Solvents and Water-soluble Polymers.*

Wasa et al., "Spreading of Nanofluids on Solids", Nature, vol. 423, pp. 156-159, May 8, 2003.

Paiaman et al., "Feasibility of Decreasing Pipe Sticking Probability using Nanoparticles", NAFTA, vol. 60, pp. 645-647, 2009.

Srivatsa et al., "An Experimental Investigation on use of Nanoparticles as Fluid Loss Additives in a Surfactant-Polymer Based Drilling Fluid", IPTC 14952, pp. 1-19, Feb. 7, 2012.

Javeri et al., "Mitigating Loss Circulation and Differential Sticking Problems using Silicon Nanoparticles", SPE/IADC 145840, pp. 1-4, Oct. 24, 2011.

Zakaria et al., "Novel Nanoparticle-Based Drilling Fluid with Improved Characteristics", SPE 156992, pp. 1-6, Jun. 12, 2012.

HES Brochure "Barazan® D" dated Mar. 25, 2010.

HES Brochure "Baracor® 700" dated Mar. 24, 2010.

DOW Brochure "Triton™ X-100 Surfactant" dated Jan. 5, 2011.

McElfresh et al., "Stabilizing Nano Particle Dispersions in High Salinity, High Temperature Downhole Environments," SPE 154758, pp. 1-6, Jun. 12, 2012.

McElfresh et al., "Application of Nanofluid Technology to Improve Recovery in Oil and Gas Wells," SPE 154827, pp. 1-5, Jun. 12, 2012.

Shahrabadi et al., Experimental Investigation of HLP Nanofluid Potential to Enhance Oil Recovery: A Mechanistic Approach, SPE 156642, pp. 1-9, Jun. 12, 2012.

Roustaei et al., "An Experimental Investigation of Polysilicol Nanoparticles' Recovery Efficiencies Through Changes in Interfacial Tension and Wettability Alteration," SPE 156976, 1-7, Jun. 12, 2012.

U.S. Appl. No. 13/851,374, filed Mar. 27, 2013, by Lee J. Hall et al.

International Search Report and Written Opinion for Application No. PCT/US2014/062599 dated Feb. 10, 2015.

Australian Patent Examination Report No. 2 for Australian Patent Application No. 2014342567 dated Nov. 3, 2016.

Yin Zhu Ye et al. "Nano-Materials Create a Whole New World to Oil Industry", Key Engineering Materials, vol. 519, Jul. 26, 2012 pp. 256-260.

Extended European Search Report for European Patent Application No. 14774413.0 dated Oct. 25, 2016.

* cited by examiner

USE OF NANOPARTICLES IN CLEANING WELL BORES

CROSS-REFERENCE TO RELATED APPLICATIONS

This application is a continuation-in-part of U.S. patent application Ser. No. 13/851,374, titled "Methods of Mitigating Bituminous Material Adhesion Using Nanoparticles," filed on Mar. 27, 2013, the entire disclosure of which is incorporated herein by reference.

BACKGROUND

The present embodiments relate to subterranean operations, and in some embodiments, to the use of nanoparticles in well bore cleaning.

A variety of drilling fluids have been used in drilling subterranean well bores. As used herein, the term "drilling fluid" may refer to any of a number of liquid and gaseous fluids, and/or mixtures of fluids and solids (e.g., solid suspensions, mixtures and emulsions of liquids, etc.) used in operations to drill well bores in subterranean formations. In some instances, a drilling fluid may be an aqueous-based fluid that comprises clays and/or polymers. During the drilling of a well bore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and remove drill cuttings from the well bore. A drilling fluid may be circulated downwardly through a drill pipe and drill bit and then upwardly through the well bore to the surface.

As the drilling fluid is circulated, a residue may be left behind on the surface of the well equipment and on the surface of the well bore itself. The residue may be referred to as a "filter cake" when formed on the walls of the well bore. The term "drilling fluid residue" as used herein may refer to the residue deposited on well equipment or on a permeable medium when a slurry, such as a drilling fluid, is forced against the equipment or medium while under pressure. Well equipment may comprise, but is not to be limited to oil and gas well, drilling, and completion equipment. Specific examples of well equipment may include pipe string, drill pipes, drill collars, drill bits, mud motors, directional drills, casings, liners, shakers, shaker screens, centrifuges, metal lines, fittings, impellers, and the like. Well equipment may not necessarily be in the well bore or used in the well bore when treated but may be treated at any time in conjunction with use in drilling or treating the well bore.

Once the well bore has been drilled to a desired depth, the drill string and drill bit may be removed from the well bore, and a pipe string (e.g., casing, liners, etc.) may be introduced into the well bore. After the pipe string is introduced into the well bore, the well bore may be conditioned by circulating the drilling fluid downwardly through the interior of the pipe string and upwardly between the annulus of the exterior of the pipe string and the subterranean formation. The purpose of this conditioning may be to remove as much of the drilling fluid residue from the well equipment and the walls of the well bore as possible. Unfortunately, at the end of this conditioning process, the drilling fluid residue may remain on the surfaces of the well equipment and the well bore. This may create problems with subsequent processing, such as in primary cementing operations. This incompatibility may result in a lack of bonding between the set cement composition and the surfaces in the well bore.

To mitigate the above-described problem, treatment fluids containing surfactants and other chemicals have been introduced into the well bore between the drilling fluid and the cement composition. The treatment fluid may be pumped ahead of the cement composition to help ensure effective mud removal and efficient cement placement. As the drilling fluid is displaced, the treatment fluid contacts the drilling fluid residue on the well bore and well equipment surfaces to at least partially remove the drilling fluid residue therefrom.

Additional cleanup issues may result from well equipment contacting tar and/or heavy oil during drilling operations. For example, many subterranean operations involve the drilling of a well bore from the surface through rock and/or soil to penetrate a subterranean formation containing fluids that are desirable for production. In the course of drilling operations and other subterranean operations, the drill string and/or other equipment and tools may come into contact with zones of rock and/or soil containing tar and/or heavy oil, such as heavy and light (liquid) hydrocarbons, asphalt, and bitumen; collectively referred to herein as "bituminous materials;" furthermore these zones are collectively referred to herein as "bituminous sand zones." In many such operations, it may be desirable to drill the well bore through these bituminous sand zones. However, problems may be encountered when drilling through bituminous sand zones. For example, bituminous materials are typically tacky substances that may adhere to surfaces they contact. In addition, bituminous materials may dissolve into many types of treatment fluids used in the course of drilling operations, increasing the tackiness and adhesive properties of the bituminous materials. If a sufficient amount of bituminous materials adheres to surfaces in the well equipment, it may, among other problems, prevent the drillstring from rotating, prevent fluid circulation, increase non-productive time, create torque and drag issues, cause tool damage, or otherwise impede the effectiveness of a drilling operation. In some cases, it may become necessary to remove and/or disassemble the drillstring in order to remove accretions of bituminous materials, a process which may create numerous cost and safety concerns. The accretion of bituminous materials on drilling equipment and/or in the well bore also can impede any subsequent operations downhole, including cementing, acidizing, fracturing, sand control, and remedial treatments. In addition, soft, tacky bituminous materials that manage to reach the surface may foul surface equipment, including solids screening equipment and solids control equipment, for example, by binding shaker screens.

Existing methods of managing the problems that result from well bore bituminous material incursion may be problematic. Examples of conventional methods may utilize treatment fluids that comprise dispersants, surfactants, and/or solubilizers, which allow the bituminous materials to dissolve in or homogenize with the treatment fluids. However, the bituminous materials may not be readily separated out of the fluid once they have dissolved into or homogenized with the fluid. The presence of the bituminous materials in the treatment fluid may alter its rheological properties and/or suspension capacity, which may limit its use in subsequent operations. Moreover, the addition of these dispersants, surfactants, and solubilizers may increase the complexity and cost of the drilling operation.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
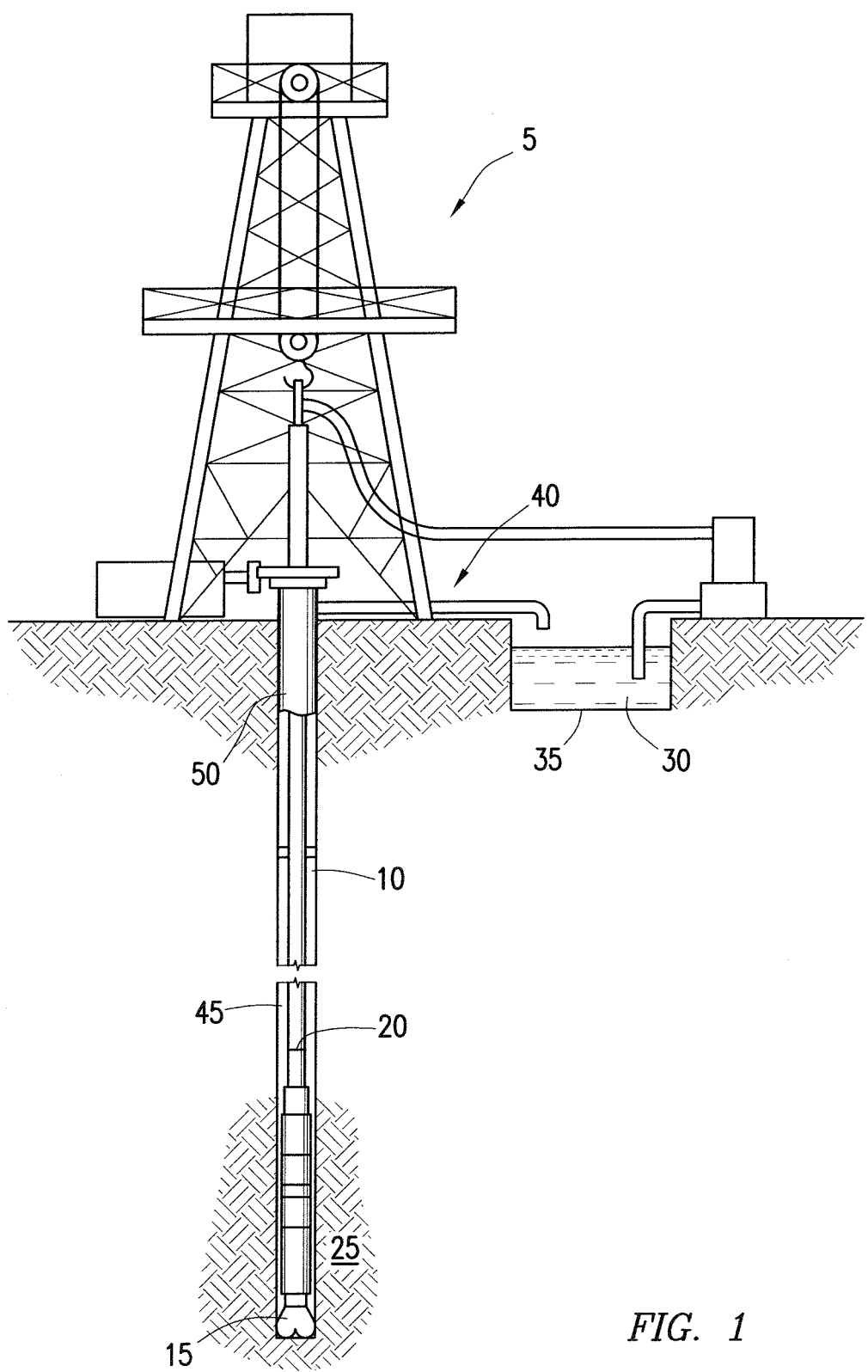
FIG. 1 illustrates a system for drilling a well bore in accordance with certain embodiments.

The present embodiments relate to subterranean operations, and in some embodiments, to the use of nanoparticles in well bore cleaning.

Embodiments generally comprise a treatment fluid for applying a solid nanoparticle suspension to the well equipment. As used herein, the term "treatment fluid" refers to any fluid that may be used in a subterranean formation or in conjunction with drilling in a subterranean formation. The term "treatment fluid" does not imply any particular action by the fluid or any component thereof. Treatment fluids may be used, for example, to drill, complete, work over, fracture, repair, clean, filter, or in any way prepare a well bore and/or well equipment for recovery of materials residing in a subterranean formation penetrated by the well bore. Well equipment may comprise, but is not to be construed as being limited to, oil and gas well equipment and drilling and completion equipment. Specific examples of well equipment includes pipe string, drill pipe, drill collars, drills bits of all types, mud motors, directional drills, casings, liners, shakers and shaker screens, centrifuges, metal lines, fittings, impellers, etc. Well equipment may not necessarily be in the well bore or used in the well bore when treated but may be treated at any time in conjunction with their use in drilling or treating the well bore. For example, the well equipment may be used at the surface during the well bore operation. Examples of treatment fluids include, but are not limited to, cement compositions, drilling fluids, spacer fluids, cleaning fluids, and spotting fluids.

Among other things, the treatment fluids of the present embodiments may be used to at least partially remove drilling fluid residue (including filter cake) and bituminous materials from well equipment and well bore surfaces. In embodiments, the drilling fluid residue may comprise an oil-based film that adheres to the surfaces of the well bore and/or the well equipment. A surface that has contacted an oil-based fluid may be referred to as "oil-wet". Oil-wet surfaces may pose compatibility issues with later operations. Therefore, the treatment fluids generally should be capable of water-wetting well equipment (i.e. by removing any oil-based film that is contacting the surface) and/or well bore surfaces. A "water-wet" surface is a surface that has contacted a water-based fluid, and is therefore not oil-wet.

In embodiments, the treatment fluids comprise nanoparticles. Generally, any solid nanoparticles that are non-magnetic and can be dispersed in the aqueous fluid may be used in embodiments. In embodiments comprising the removal of bituminous materials from drilling fluids, the solid nanoparticles should not emulsify the bituminous materials. In embodiments comprising the removal of drilling fluid residue from well equipment and/or well bore surfaces, the nanoparticles may emulsify the drilling fluid residue. In alternative embodiments, the nanoparticles may not emulsify the drilling fluid residue. Whether or not the nanoparticles emulsify the drilling fluid residue is dependent upon the type of nanoparticle chosen, surface modifications, additives required, type of drilling fluid residue to be removed, and the like. Whether or not the drilling fluid residue should be emulsified is dependent on the application.

In embodiments, in order to increase particle mobility the solid nanoparticles may comprise almost spherical morphologies with aspect ratios near unity. For example, the solid nanoparticles may have a roundness and sphericity, as measured on the Krumbein scale, of greater than 0.7, in some embodiments, and greater than about 0.9 in alternative embodiments. The nanoparticles may be ionic or nonionic in nature. In certain embodiments, the solid nanoparticles may interact with the surface of the well equipment to form a film at the interface between the drilling fluid residue (or the bituminous materials) and the well equipment (or the well bore surfaces) wherein the film of solid nanoparticles exerts a disjoining force, between the interface of the drilling fluid residue (or the bituminous materials) and the surface to be cleaned in order to separate the two. The solid nanoparticle treatment fluid should be added to the well bore in a quantity sufficient to treat the drilling fluid residue or the bituminous materials therein, in accordance with embodiments.

In certain embodiments, the concentration of the solid nanoparticles in the treatment fluid may be at least about 0.1% by volume of the fluid. As an example the solid nanoparticles may be present in an amount of at least about 0.1%, at least about 0.2%, at least about 0.3%, etc. as well as at least about 1%, at least about 2%, at least about 3%, at least about 4%, at least about 5%, etc. For example, the concentration of the solid nanoparticles in the treatment fluid may be in the range of from about 0.5% to about 1% by volume of the fluid. As another example, the concentration of the solid nanoparticles in the treatment fluid may be in the range for from about 0.1% to about 5% by volume of the fluid. In certain embodiments, the solid nanoparticles may be added to a treatment fluid, or introduced directly into the well bore, as dispersed particles. One of ordinary skill in the art, with the benefit of this disclosure, should be able to determine the appropriate concentration of the nanoparticles in the treatment fluid for a particular application.

In certain embodiments, solid nanoparticles may have a particle size of less than about 200 nanometers (nm). The solid nanoparticles may have a particle size that ranges between or includes any of about 1 nm, about 2 nm, about 3 nm, about 4 nm, about 50, about 100, about 150, about 197 nm, about 198 nm, about 199 nm, or about 200 nm. In certain embodiments, the size of the nanoparticles may be in the range of from about 1 nm to about 50 nm. In certain embodiments, the size of the solid nanoparticles may be in the range of from about 5 nm to about 50 nm. In certain embodiments, the size of the solid nanoparticles may be in the range of from about 5 nm to about 200 nm. In certain embodiments, the solid nanoparticles may be added to a treatment fluid, or introduced directly into the well bore, as dispersed particles. One of ordinary skill in the art, with the benefit of this disclosure, should be able to determine the appropriate size of the solid nanoparticles in the treatment fluid for a particular application.

Examples of solid nanoparticles that may be suitable for use in the treatment of drilling fluid residue or bituminous materials may include, but are not limited to, nano-elements such as nano-silica, nano-alumina, nano-zinc oxide, nano-boron, nano-oxides such as $SiO_2$, $Al_2O_3$, boehmite (γ-AlO(OH)), $TiO_2$, ZnO, $Fe_2O_3$, ZrO, and/or others; nano-carbonates such as $CaCO_3$ and/or others; nano-silicon compounds such as SiC, $Si_3N_4$, and/or others; and nano-carbon based particles such as graphite, fullerenes, activated carbon, various grades of amorphous carbon black, and/or others. Combinations of two or more nanoparticles (including combinations of classes of nanoparticles) may also be suitable in certain embodiments. In certain embodiments, the nanoparticles may be particulate in nature and not, for example, a colloidal nano-particle or a suspension of the nano-particle in solution.

In addition to the use of the nanoparticles without encapsulation, embodiments may comprise encapsulation of the nanoparticles to facilitate transportation and incorporation of the nanoparticles in well treatment fluids. Specifically, encapsulation of the nanoparticles in accordance with present embodiments may include enclosing the nanoparticles within an outer coating or container in particulate form.

Various types of encapsulation may be employed such that the nanoparticles are contained but retain their particulate nature. For example, the nanoparticles may be encapsulated within a bag, capsule, layer, coating or the like. Further, the material utilized to encapsulate the nanoparticles may be selected to facilitate transportation and/or incorporation of the nanoparticles into a well treatment fluid. For example, to facilitate handling of the nanoparticles and/or to facilitate timed release of the nanoparticles, the encapsulation material may be degradable. This may facilitate handling of the nanoparticles by allowing inclusion of the encapsulated nanoparticles in a well treatment fluid without requiring that the nanoparticles first be removed from the encapsulating material. Further, the encapsulating material may be designed to degrade at a certain rate when in contact with certain materials (e.g., water) so that the nanoparticles are released into the well treatment fluid at a desired time.

The aqueous fluid utilized in the treatment fluids may be fresh water, salt water (e.g., water containing one or more salts dissolved therein such as single salt fluids or salt mixture fluids), brine (e.g., fresh or saturated saltwater produced from subterranean formations (including manufactured or natural brine)), seawater, or combinations thereof. For example, the nanoparticles may be dispersed in the aqueous fluid to form the treatment fluid. In certain embodiments, the treatment fluid may be an aqueous-based fluid. Generally, the water can be from any source, provided that it does not contain compounds that undesirably affect other components of the treatment fluid. In embodiments, the water may be added in an amount such that the composition comprises about 50% to about 70% water.

Optionally, some embodiments may include a surfactant to, among other reasons, aid in the suspension of the nanoparticles. Generally, any surfactant that does not interact negatively with the nanoparticles will be suitable. In certain embodiments, it may be desirable to select a surfactant that will not emulsify the bituminous materials sought to be treated. In certain embodiments, the surfactants may be present in an amount sufficient to suspend the nanoparticles. This amount may depend on, among other things, the type of surfactant used, the amount of the nanoparticles to be suspended, etc. Examples of surfactants include anionic surfactants such as sodium dodecyl sulfate, sodium dodecyl benzene sulfonate, and BARACOR 700® corrosion inhibitor available from Halliburton Energy Services, Inc.; non-ionic surfactants such as polysorbate 80, Triton® X-100 available from The Dow Chemical Company, and Pluronic® available from BASF. A person of ordinary skill in the art should recognize, with the benefit of this disclosure, the type and amount of surfactant that should be added for a particular application.

In certain embodiments, the treatment fluids may also comprise additional components to enhance, among other things, the performance of the nanoparticles in specific applications. For example, some embodiments may comprise a viscosifier to aid in suspending the nanoparticles in a treatment fluid among other reasons. Without limitation, suitable viscosifying agents may include colloidal agents (e.g., clays such as bentonite), diatomaceous earth, biopolymers (e.g., xanthan gum, guar gum, chitosan, polysaccharides), synthetic polymers (e.g., polyacrylates, polyacrylamides), or mixtures thereof. An example of which includes BARAZAN® D viscosifier, available from Halliburton Energy Services Inc. A person of ordinary skill in the art should recognize, with the benefit of this disclosure, the type and amount of viscosifier that should be added for a particular application.

Certain embodiments may also comprise additional components to enhance, among other things, the performance of the solid nanoparticles in specific applications. The solid nanoparticles may be functionalized by a surface modification or surface treatment with the desired functional groups. For example, some embodiments may comprise surface treatment of the nanoparticles with one or more polymers which, among other purposes, may aid in suspending the nanoparticles in a treatment fluid. Suitable polymers for surface treatment may include, but are not limited to, polyvinyl pyrrolidone, polyvinyl alcohol, polyacrylic acid, polyvinyl acetate, polyethyleneimine, and any combinations thereof. A person of ordinary skill in the art should recognize, with the benefit of this disclosure, the type and amount of polymer that should be added for a particular application.

Additional embodiments may also comprise additional components to enhance, among other things, the removal of drilling fluid residue and/or bituminous materials. For example, the solid nanoparticles may be paired with additional treatment materials to produce a synergistic effect in the treatment of the drilling fluid residue and/or bituminous materials. As an example, some embodiments may comprise polymers which, among other functions, may provide a different yet synergistic drilling fluid residue and/or bituminous material treatment action. Examples of which may include an acrylonitrile-butadiene copolymer comprising two or more different monomers wherein the monomers may be substituted with a number of different groups that will be evident to those of ordinary skill in the art, including without limitation chloro groups, bromo groups, fluoro groups, alkyl groups, alkoxy groups, alkenyl groups, alkynyl groups, aryl groups, alkoxy groups, and substituted versions thereof. Additional examples include styrene polymers comprising styrene copolymers which include co-monomers of styrene or any derivative thereof, wherein the styrene may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof. Further examples include acrylate polymers which include co-monomers of acrylate or any derivative thereof, wherein the acrylate may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof; additionally in accordance with present embodiments, the acrylate may comprise two or more units individually selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, any derivative thereof. Other examples include styrene-acrylate polymers such as styrene-acrylate copolymers and mixed copolymers which include at least one of styrene, a substituted styrene, and any derivative thereof; and at least one of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, or any derivative thereof. Combinations of these different materials may also be used. A person of ordinary skill in the art should recognize, with the benefit of this disclosure, the type and amount of polymer that should be added for a particular application.

In some embodiments, the treatment fluids may comprise one or more additional cleaning additives suitable for use in removal of drilling fluid residue. Examples of suitable cleaning additives may include surfactants, solvents, and combinations thereof. Surfactants may be cationic, anionic, or nonionic. Specific examples of suitable include, without limitation, ethoxylated alcohols, propoxylated alcohols, betaines, alkyl poylglycosides, alkyl sulfates, amine oxides, and combinations thereof. Solvents that may be used include without limitation alkyl esters, glycols, glycol ethers, and combinations thereof. One of ordinary skill in the art, with the benefit of this disclosure, should be able to determine the specific type and amount of the additional cleaning additive to include for a particular application.

Certain embodiments may also comprise covalently functionalizing the nanoparticles to enhance, among other things, the performance of the nanoparticles in specific applications. For example, some embodiments may comprise nanoparticles which comprise covalently bonded reactive functional groups. These reactive functional groups may bind additional additives or alter the behavior of the nanoparticles in the treatment fluid and/or well bore. Functional groups may include tricholorosilanes, alkoxysilanes, esters, alcohols, acids, amines, amides, and carboxylates. Specific examples of which include n-propylamine, stearic acid, polyethylene glycol chains, phenol, R—Si—Cl$_3$, R—Si-(EtOH)$_3$, and R—Si-(MeOH)$_3$ wherein R may be an n-alkyl (C6-C18). The reactive functional groups may be any group suitable for binding the targeted substrate or altering the behavior of the solid nanoparticles. Likewise, the process of covalently functionalizing the solid nanoparticles may comprise any process suitable for binding the reactive functional group to the targeted nanoparticle. With the benefit of this disclosure, a person of ordinary skill in the art should recognize the type of covalent functionalization and reactive functional group necessary for a given application.

Optional embodiments of the treatment fluids may comprise additional additives to enhance the performance of the fluid. The treatment fluids may comprise any such additives that do not undesirably interact with the solid nanoparticles or other components of the fluid. Generally, in embodiments used to treat bituminous materials, the additives should not emulsify or dissolve the bituminous materials to be treated. In embodiments used to treat drilling fluid residue, the additives may or may not emulsify the drilling fluid residue, depending upon the application. Without limitation, the treatment fluids may comprise any number of additional additives including salts, fluid-loss-control additives, gas, nitrogen, carbon dioxide, curing agents, formation conditioning agents, surface-modifying agents, tackifying agents, foamers, defoamers, corrosion inhibitors, scale inhibitors, catalysts, clay-control agents, biocides, friction reducers, antifoam agents, bridging agents, dispersants, flocculants, $H_2S$ scavengers, $CO_2$ scavengers, oxygen scavengers, lubricants, breakers, weighting agents (e.g., barite), relative-permeability modifiers, resins, particulate materials (e.g., proppant particulates), wetting agents, coating-enhancement agents, combinations thereof, and the like. One of ordinary skill in the art, with the benefit of this disclosure, should be able to determine which additional additives are appropriate for a particular application.

Embodiments should not be construed to comprise one additive, component, or embodiment to the exclusion of others. Embodiments may comprise suspensions of solid nanoparticles alone, solid nanoparticles and surfactants, covalently functionalized solid nanoparticles alone, covalently functionalized solid nanoparticles and surfactants, solid nanoparticles and polymers, covalently functionalized solid nanoparticles and polymers, solid nanoparticles and surfactants and polymers, covalently functionalized solid nanoparticles and surfactants and polymers, and any combinations therein. With the benefit of this disclosure, a person of ordinary skill in the art should recognize the type and functionalization (if necessary) of solid nanoparticles and any additional additive(s) necessary to formulate a treatment fluid for a specific well bore operation.

In embodiments, the treatment fluid may be used to treat bituminous materials. Bituminous materials may comprise tar. In embodiments, tar treated by the methods disclosed herein may be less able to adhere to a surface. As a result, tar treated in this manner may be susceptible to screen separation from treatment fluids, drill cuttings, tar sands, and the like. In some embodiments bituminous materials may comprise heavy oil. The treatment fluids may be used for the treatment of heavy oil in a well bore. It should be understood that the terms "heavy oil," "crude oil," and "liquid crude" may be used interchangeably. Heavy oil is generally a naturally occurring liquid that can contain various quantities of paraffins, napthenenes, aromatics, and/or asphaltenes. The heavy oil should be differentiated from the preceding tar, as the heavy oil has an API measured gravity greater at about 10 or greater while the tar has an API specific gravity of less than 10. In some instances, natural gas may be dissolved in the heavy oil. Heavy oil may be produced from well bores drilled into the Earth's surface. When encountered in the well bore by treatments fluids, the heavy oil can emulsify into the fluid undesirably effecting fluid properties and causing problems with fluid disposal.

Without being limited by theory, the following is one description of a proposed mechanism of action. Generally embodiments may comprise allowing a treatment fluid comprising solid nanoparticles to interact with the surface of the well equipment and/or the well bore surfaces, which may, among other things, reduce the adhesiveness of the drilling fluid residue and/or the bituminous materials to the well equipment, which may facilitate removal of the drilling fluid residue and/or the bituminous materials from the well equipment and/or a well bore surface. When the solid nanoparticles interact with a surface (e.g., the surface of a piece of well equipment) the nanoparticles coat the surface of the material and form a film. The solid nanoparticles should self-assemble into the film at the surface of the well equipment. In accordance with present embodiments, the solid nanoparticles exert a disjointing force, sometimes referred to as a disjoining pressure that is concentrated at the interface between the drilling fluid residue (or the bituminous materials) and the surface to be cleaned. It is believed that this disjointing force should create, through surface energetics and Brownian motion, a wedge that drives the separation of the drilling fluid residue (or the bituminous materials) from the surface to be cleaned. It is further believed that as the solid nanoparticle film grows, it is replenished by the addition of solid nanoparticles from the suspension. Without being limited by theory, the smaller the particles are, the faster they are able to move through the medium at a given temperature. Thus, the smaller particles have a greater probability, as compared to larger particles, to add to the growing wedge and to do so in a shorter time. Without being limited by theory, the film thickness scales at approximately a factor of 1.2 multiplied by the diameter of the solid nanoparticle for up to approximately five layers. The addition of surfactants or other binding groups can alter the size of the wedge. The size or thickness of a functioning wedge can range from about 5 nm to about 350 nm.

An embodiment provides a method comprising contacting the surface of well equipment with a treatment fluid comprising an aqueous fluid and solid nanoparticles. In such embodiments, solid nanoparticles may be provided in various forms, including, but not limited to, an emulsion, a suspension, a powder, and any combination thereof. In certain embodiments, the treatment fluid may be an aqueous-based fluid. Introducing the solid nanoparticles to the vicinity of a desired portion of the well equipment may be accomplished by a variety of methods known by a person of ordinary skill in the art with the benefit of this disclosure. One example of such a method comprises pumping water into the well bore, wherein the nanoparticles are carried into the well bore on the leading edge of the water (e.g., a plug). In other embodiments, the nanoparticles may be pumped into the well bore while suspended in a treatment fluid.

In certain embodiments, the nanoparticles may be provided as a "spot treatment" or "pill," wherein the nanoparticles are pumped into the well bore to interact with the drilling fluid residue and/or the bituminous materials on a specific portion of the well equipment and/or on a specific portion of the well bore. In certain embodiments of this type, the solid nanoparticles may be allowed to interact with the well equipment and/or well bore surface for at least an amount of time sufficient to at least partially reduce the amount of drilling fluid residue and/or bituminous material attached to the well equipment and/or well bore surface. In some circumstances, this may be more than about one hour. In others, more time will be required, depending upon, among other factors, the temperature inside the well bore and the amount of drilling fluid residue and/or bituminous material on the portion of the well equipment surface and/or the well bore surface being treated. One of ordinary skill in the art, with the benefit of this disclosure, should be able to determine the appropriate amount of time to allow the nanoparticles to interact with the surface to be cleaned. In certain embodiments, after the nanoparticles have been allowed to interact with the surface to be cleaner, the drilling fluid residue and/or bituminous materials may then be removed from the well bore by any means practicable for a given application.

In some applications, embodiments may be used in conjunction with non-aqueous treatment fluids. Embodiments such as a spot treatment or pill may be especially suited for use in conjunction with non-aqueous-based treatment fluids. Where the treatment fluid is non-aqueous based, the treatment fluid may comprise any number of organic liquids. Without limitation, examples of suitable organic liquids include mineral oils, synthetic oils, esters, paraffin oils, diesel oil, and the like.

The treatment fluids may be used in any application in which it is appropriate or desirable to use such a treatment fluid. In some embodiments, the treatment fluids may be used to at least partially remove a drilling fluid from well equipment surfaces and/or surfaces in a well bore. Such well equipment surfaces may include the exterior or interior surfaces of a pipe string (if any) located in the well bore or the walls of the well bore. In some embodiments, the treatment fluids may remove at least a substantial portion of a drilling fluid residue from the well equipment and/or well bore surfaces. Additionally, the treatment fluids also may remove at least a portion of a filter cake from the well bore surfaces. Additionally, the treatment fluids may also be used to displace a drilling fluid located in the well bore, such drilling fluid may at least partially fill an annulus between the subterranean formation and a pipe string located in the subterranean formation.

An embodiment may comprise providing a treatment fluids comprising water and solid nanoparticles. The treatment fluid may then contact a well equipment and/or well bore surface to thereby at least partially remove the drilling fluid residue from the well equipment and/or well bore surface. The contacting of the well equipment and/or well bore surface with the treatment fluid composition may be static, dynamic, or intermittently static and dynamic. Factors such as viscosity of the fluid, pump rate of the composition, and hole geometry may determine the conditions at which the composition is delivered. In embodiments, the treatment fluid may be introduced into the well bore intermittently and at varying rates to enhance dispersion of the drilling fluid and the filter cake into the treatment fluid composition. In certain embodiments, the treatment fluid may be introduced into the well bore in turbulent flow. Additionally, the contacting of the well equipment and/or well bore surfaces with the treatment fluid may further comprise introducing the treatment fluid into the well bore so as to contact the well equipment and/or well bore surfaces thereby at least partially dispersing the drilling fluid and the filter cake into the treatment fluid composition. With the benefit of this disclosure, one of ordinary skill in the art will recognize the appropriate conditions for delivery dictated by a desired use.

Additionally, in certain embodiments, the treatment fluid may be introduced into an annulus between a subterranean formation and a pipe string located in the subterranean formation. In accordance with embodiments, a cement composition may be introduced into the annulus so that the treatment fluid is at least partially displaced from the annulus. Thereafter, the cement composition may be allowed to set. The cement composition may be any cement composition suitable for use in a subterranean formation. Generally, the cement composition may comprise water, cement, and optionally any suitable additives.

An embodiment comprises comprising contacting drilling fluid residue and/or bituminous materials with a treatment fluid comprising an aqueous fluid and nanoparticles by pumping the treatment fluid into a well bore in a manner such that it may contact the surface of well equipment and/or a surface of the well bore and allowing the treatment fluid to interact with the drilling fluid residue and/or the bituminous materials to at least partially reduce the amount of drilling fluid residue and/or bituminous materials attached to a surface and/or the tendency of the bituminous materials to adhere to a surface. In certain embodiments of this type, the treatment fluid may be allowed to interact with the drilling fluid residue (or the bituminous materials) and the well equipment surface (or well bore surface) as long as the treatment fluid is present in the well bore. One of ordinary skill in the art, with the benefit of this disclosure, should be able to determine the appropriate amount of time to allow the treatment fluid to interact with the drilling fluid residue (or the bituminous materials) and the well equipment surface (or well bore surface) so as to at least partially remove the drilling fluid residue and/or bituminous materials from the surface to be cleaned. In certain embodiments, after the treatment fluid has been allowed to interact with the drilling fluid residue and/or the bituminous materials, the drilling fluid residue and/or bituminous materials may be filtered or removed from the well bore by any means practicable for the given application.

Another embodiment comprises placing a treatment fluid comprising an aqueous fluid and solid nanoparticles into a well bore; and monitoring the amount of solid nanoparticles present in the treatment fluid. For example, once a unit of solid nanoparticles in a treatment fluid is allowed to interact with a unit of the drilling fluid residue (or the bituminous materials) or the well equipment surface (or well bore surface), that unit of solid nanoparticles may be depleted from the treatment fluid and thus unable to produce further interactions. For this reason, it may be desirable to monitor the concentration of the solid nanoparticles in the treatment fluid to determine if additional solid nanoparticles should be added. In some embodiments, the solid nanoparticles may be introduced into the treatment fluid before the treatment fluid is introduced into the well bore, for example, a batch-mixing process. In some embodiments, it may be desirable to continue to add the solid nanoparticles to the treatment fluid (e.g., "on-the-fly" mixing) according to the monitored concentration of the solid nanoparticles in the treatment fluid. In some embodiments, the concentration of solid nanoparticles in the treatment fluid may be monitored by direct measurement. In some embodiments, the concentration of solid nanoparticles in the treatment fluid may be monitored indirectly by measuring the depletion of the solid nanoparticles from the treatment fluid. The concentration of the solid nanoparticles in the treatment fluid may be monitored, for example, by filtration followed by dynamic light scattering, analytical polymer spectroscopy, chromatography, gravimetry, and quantitative precipitation.

Another embodiment comprises a method of drilling a well bore. The method comprising the use of a drill bit to enlarge a well bore and then circulating a treatment fluid past the drill bit to remove cuttings therefrom, wherein the treatment fluid comprises an aqueous fluid and solid nanoparticles. In certain embodiments, bituminous materials may be present within the well bore, and the solid nanoparticles may be allowed to interact with the surface of the well equipment and/or the bituminous materials to at least partially remove the bituminous materials from the surface of the well equipment. In certain embodiments, after the solid nanoparticles have been allowed to interact with the well equipment and/or the bituminous materials, the bituminous materials may then be filtered and/or removed from the well bore by any means practicable for the given application.

In applications where it is desirable to drill through bituminous sand zones encountered in the course of drilling a well bore, cuttings may be removed more effectively from the well bore. In additional embodiments, treated bituminous materials may be separated from a treatment fluid or other fluids mixed with the treatment fluid by passing the fluid(s) through a screen or similar separation apparatus.

In accordance with present embodiments, in well bore operations where bituminous materials that comprise heavy oil are encountered, treatment with a treatment fluid comprising nanoparticles may not emulsify the heavy oil in the treatment fluids. As a result, heavy oil treated in this manner may be susceptible to screen separation from the treatment fluid or other fluids mixed with the treatment fluid as well as drill cuttings, bituminous sands, and the like.

In accordance with some embodiments, some methods may comprise allowing a treatment fluid comprising solid nanoparticles to interact with bituminous materials comprising heavy oil in a well bore, which may, among other things, cause the heavy oil to agglomerate to facilitate removal of the heavy oil from the treatment or other present fluids and prevent emulsification. In addition, treated bituminous materials comprising heavy oil may be separated from a treatment fluid or other fluids mixed with the treatment fluid by passing the fluid(s) through a screen or similar separation apparatus.

An embodiment comprises a method of removing drilling fluid residue from the surfaces of well equipment, the method comprising: applying a solid nanoparticle film to at least a portion of the surfaces of the well equipment with a treatment fluid comprising solid nanoparticles; and allowing the solid nanoparticles to interact with the surfaces of the well equipment and the drilling fluid residue adhered to the surfaces of the well equipment to remove at least a portion of the drilling fluid residue from the surfaces of the well equipment.

An embodiment comprises a method of treating drilling fluid residue, the method comprising: providing a treatment fluid comprising solid nanoparticles; contacting the surfaces of well equipment with a treatment fluid, the surfaces of the well equipment comprising a drilling fluid residue adhered to said surfaces; allowing the solid nanoparticles to interact with the surfaces of the well equipment and the drilling fluid residue adhered to the surfaces of the well equipment to remove at least a portion of the drilling fluid residue from the surfaces of the well equipment; wherein the removal of the drilling fluid residue from the surfaces of the well equipment further comprises changing the surfaces of the well equipment from an oil-wet surface to a water-wet surface; and recovering the treatment fluid and the removed drilling fluid residue out of the well bore.

An embodiment comprises a system for treating drilling fluid residue, the system comprising: well equipment comprising a surface; drilling fluid residue, wherein the drilling fluid residue coats and adheres to at least a portion of the surface of the well equipment; and a treatment fluid comprising solid nanoparticles; wherein the treatment fluid removes at least a portion of the drilling fluid residue from the surface of the well equipment.

As previously described, embodiments may be used for removal of drilling fluid residue. Referring now to FIG. 1, one embodiment of a typical drilling system is shown. As shown in FIG. 1, a drilling rig 5 may be disposed atop a well bore 10. A drill bit 15 may located at the lower end of the drill string 20. As the drill bit 15 rotates, it creates the well bore 10 that penetrates through the subterranean formation 25. Drilling fluid 30 may be pumped from a storage reservoir pit 35 near the wellhead 40, down an axial passage (not shown) through the drill string 20, out of apertures in the drill bit 15 and back to the surface through an annulus 45 defined between the drill string 20 and the walls of the well bore 10. Surface casing 50 may be positioned in the well bore 10 above the drill bit 15 for maintaining the integrity of the upper portion of the well bore 10. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. In addition, while well bore 10 is shown extending generally vertically into the subterranean formation 25, the principles described herein are also applicable to well bores that extend at an angle through the subterranean formation 25, such as horizontal and slanted well bores.

Figure 2:
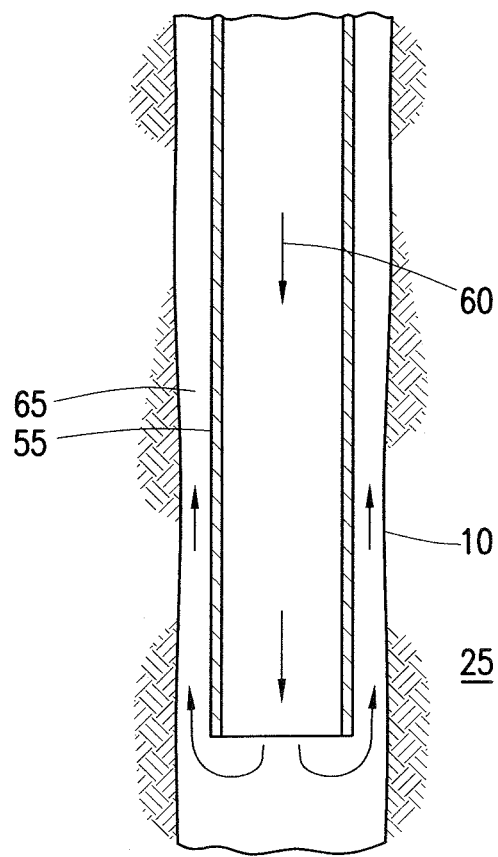
FIG. 2 illustrates removal of drilling fluid residue from intermediate casing in accordance with certain embodiments.

With additional reference to FIG. 2, after following drilling of the well bore 10 or a segment thereof, the drill string 20 may be pulled out of the well bore 10 and intermediate casing 55, may be run into the well bore at least down to the subterranean formation 25. After the drill string 20 has been removed, drilling fluid residue from the drilling fluid 30 may remain in well bore 10 and may adhere to the surfaces of well bore 10 or the surfaces of well equipment remaining in well bore 10 such as the intermediate casing 55. The treatment fluid 60 may be pumped into well bore 10 to remove drilling fluid residue. The treatment fluid 60 may be pumped down the interior of the intermediate casing 55 and back to the surface through the annulus 65 defined between the intermediate casing 55 and the walls of the well bore 10. The treatment fluid 60 may contact drilling fluid residue and remove drilling fluid residue from the intermediate casing 55. The treatment fluid 60 may comprise the removed drilling fluid residue as the treatment fluid 60 exits the well bore 10. While not shown, one or more spacer fluids may be pumped down the intermediate casing 55 in front of, or behind, the treatment fluid 60.

Figure 3:
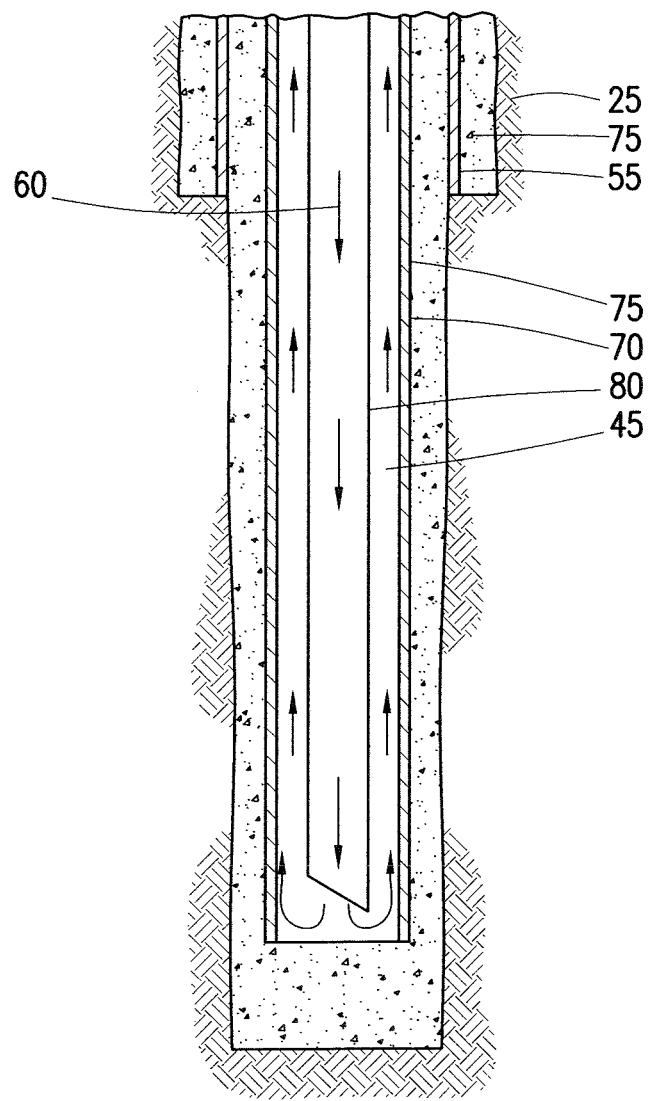
FIG. 3 illustrates removal of drilling fluid residue from production casing in accordance with certain embodiments.

With reference to FIG. 3, in embodiments comprising production casing, production casing 70 may be fixed in position with cement sheath 75. In the illustrated embodiment, the production casing 70 extends into the subterranean formation 25 beyond the intermediate casing 55. A pipe string 80 may be run into the cased well bore 10. The drilling fluid 30 (e.g., shown on FIG. 1) may be displaced from the annulus 45, leaving a residue on the inside of the production casing 70. As illustrated, the treatment fluid 60 may be pumped through pipe string 80 into annulus 45 to remove the residue. The treatment fluid 60 may contact drilling fluid residue and remove drilling fluid residue from the production casing 70. The treatment fluid 60 may comprise the removed drilling fluid residue as the treatment fluid 60 exits the well bore 10.

Figure 4:
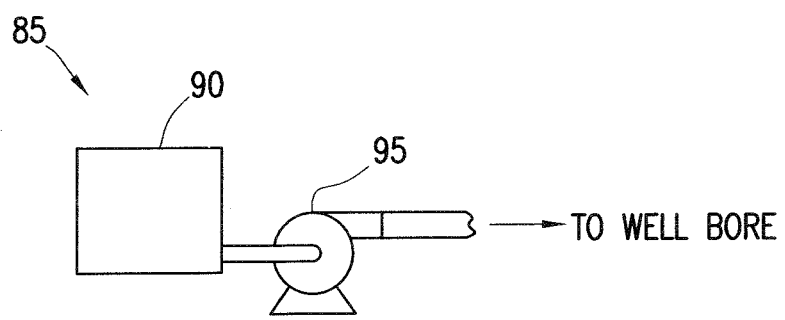
FIG. 4 illustrates a system for preparation and delivery of a treatment fluid in accordance with certain embodiments.

Referring now to FIG. 4, preparation of a treatment fluid in accordance with example embodiments will now be described. FIG. 4 illustrates a system 85 for preparation of a treatment fluid and delivery to the well bore 10 in accordance with certain embodiments. As shown, the treatment fluid may be mixed in mixing equipment 90, such as a jet mixer, re-circulating mixer, or a batch mixer, for example, and then pumped via pumping equipment 80 to the well bore. In some embodiments, the mixing equipment 95 and the pumping equipment 80 may be disposed on one or more mixing and/or pumping trucks as will be apparent to those of ordinary skill in the art.

The exemplary solid nanoparticles and/or associated treatment fluids disclosed herein may directly or indirectly affect one or more components or pieces of equipment associated with the preparation, delivery, recapture, recycling, reuse, and/or disposal of the disclosed solid nanoparticles. For example, the disclosed nanoparticles and/or associated treatment fluids may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary solid nanoparticles and/or associated treatment fluids. The disclosed solid nanoparticles may also directly or indirectly affect any transport or delivery equipment used to convey the solid nanoparticles to a well site or downhole such as, for example, any transport vessels, conduits, pipelines, trucks, tubulars, and/or pipes used to fluidically move the solid nanoparticles and/or associated treatment fluids from one location to another, any pumps, compressors, or motors (e.g., topside or downhole) used to drive the solid nanoparticles and/or associated treatment fluids into motion, any valves or related joints used to regulate the pressure or flow rate of the solid nanoparticles and/or associated treatment fluids, and any sensors (i.e., pressure and temperature), gauges, and/or combinations thereof, and the like. The disclosed nanoparticles and/or associated treatment fluids may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other well bore isolation devices or components, and the like. As previously described, the solid nanoparticles may be applied to the surface of well equipment (including downhole equipment and equipment used at the surface) to treat bituminous material adhesion.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Although individual embodiments are discussed all combinations of all embodiments are covered by this disclosure. Furthermore, no limitations are intended to the details of construction or design herein shown, other than as described in the claims below. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. It is therefore evident that the particular illustrative embodiments disclosed above may be altered or modified and all such variations are considered within the scope and spirit of the disclosure. If there is any conflict in the usages of a word or term in this specification and one or more patent(s) or other documents that may be incorporated herein by reference, the definitions that are consistent with this specification should be adopted.

What is claimed is:

1. A method of removing drilling fluid residue from surfaces of well equipment, the method comprising:
   providing solid nanoparticles that are functionalized, wherein the solid nanoparticles comprise $Fe_2O_3$ or $CaCO_3$ wherein the solid nanoparticles are functionalized with polyvinyl pyrrolidone or polyethyleneimine, wherein the solid nanoparticles have an average particle size of about 5 nm to about 50 nm, wherein the solid nanoparticles have a roundness of greater than 0.7 measured on the Krumbein scale, and wherein the solid nanoparticles have a sphericity of greater than 0.7 measured on the Krumbein scale;
   including the solid nanoparticles in a treatment fluid;
   applying a solid nanoparticle film to at least a portion of the surfaces of the well equipment with the treatment fluid; and
   allowing the solid nanoparticle film to interact with the surfaces of the well equipment and the drilling fluid residue adhered to the surfaces of the well equipment to remove at least a portion of the drilling fluid residue from the surfaces of the well equipment, wherein through surface energies and Brownian motion, the solid nanoparticle film exerts a disjointing force on the drilling fluid residue that forms a wedge driving separation of the drilling fluid residue from the surfaces of the well equipment.

2. The method of claim 1 further comprising pumping the treatment fluid through a pipe string and into an annulus between the pipe string and a casing that is fixed in the subterranean formation.

3. The method of claim 1 further comprising monitoring the amount of the solid nanoparticles present in the treatment fluid; and adding additional solid nanoparticles to the treatment fluid in response to the step of monitoring.

4. The method of claim 1 wherein the treatment fluid is placed in the well bore to interact with the drilling fluid residue present at a specific location therein.

5. The method of claim 1 wherein the treatment fluid is placed into the well bore after drilling of the well bore.

6. The method of claim 1 wherein the concentration of solid nanoparticles in the treatment fluid is between about 0.1% and about 5% by volume of the treatment fluid.

7. The method of claim 1 wherein the well equipment comprises equipment selected from the group consisting of a pipe string, a drill pipe, a drill collars, a drill bit, a mud motor, a directional drill, a casing, a liner, a shaker, a shaker screen, a centrifuge, a metal line, a fitting, an impeller, and any combination thereof.

8. A method of removing drilling fluid residue from surfaces of well equipment, the method comprising:
   providing solid nanoparticles that are functionalized, wherein the solid nanoparticles comprise nano-silica or nano-alumina wherein the solid nanoparticles are functionalized with trichlorosilane, wherein the solid nanoparticles have an average particle size of about 5 nm to about 50 nm, wherein the solid nanoparticles have a roundness of greater than 0.7 measured on the Krumbein scale, and wherein the solid nanoparticles have a sphericity of greater than 0.7 measured on the Krumbein scale;
   including the solid nanoparticles in a treatment fluid;
   applying a solid nanoparticle film to at least a portion of the surfaces of the well equipment with the treatment fluid; and
   allowing the solid nanoparticle film to interact with the surfaces of the well equipment and the drilling fluid residue adhered to the surfaces of the well equipment to remove at least a portion of the drilling fluid residue from the surfaces of the well equipment, wherein through surface energies and Brownian motion, the solid nanoparticle film exerts a disjointing force on the drilling fluid residue that forms a wedge driving separation of the drilling fluid residue from the surfaces of the well equipment.

9. The method of claim 8 further comprising pumping the treatment fluid through a pipe string and into an annulus between the pipe string and a casing that is fixed in the subterranean formation.

10. The method of claim 8 further comprising monitoring the amount of the solid nanoparticles present in the treatment fluid; and adding additional solid nanoparticles to the treatment fluid in response to the step of monitoring.

11. The method of claim 8 wherein the treatment fluid is placed in the well bore to interact with the drilling fluid residue present at a specific location therein.

12. The method of claim 8 wherein the treatment fluid is placed into the well bore after drilling of the well bore.

13. The method of claim 8 wherein the concentration of solid nanoparticles in the treatment fluid is between about 0.1% and about 5% by volume of the treatment fluid.

14. The method of claim 8 wherein the well equipment comprises equipment selected from the group consisting of a pipe string, a drill pipe, a drill collars, a drill bit, a mud motor, a directional drill, a casing, a liner, a shaker, a shaker screen, a centrifuge, a metal line, a fitting, an impeller, and any combination thereof.

* * * * *